Nov. 3, 1953
J. M. LAUNDER
2,657,806
FILTER
Filed Dec. 26, 1947
2 Sheets-Sheet 1
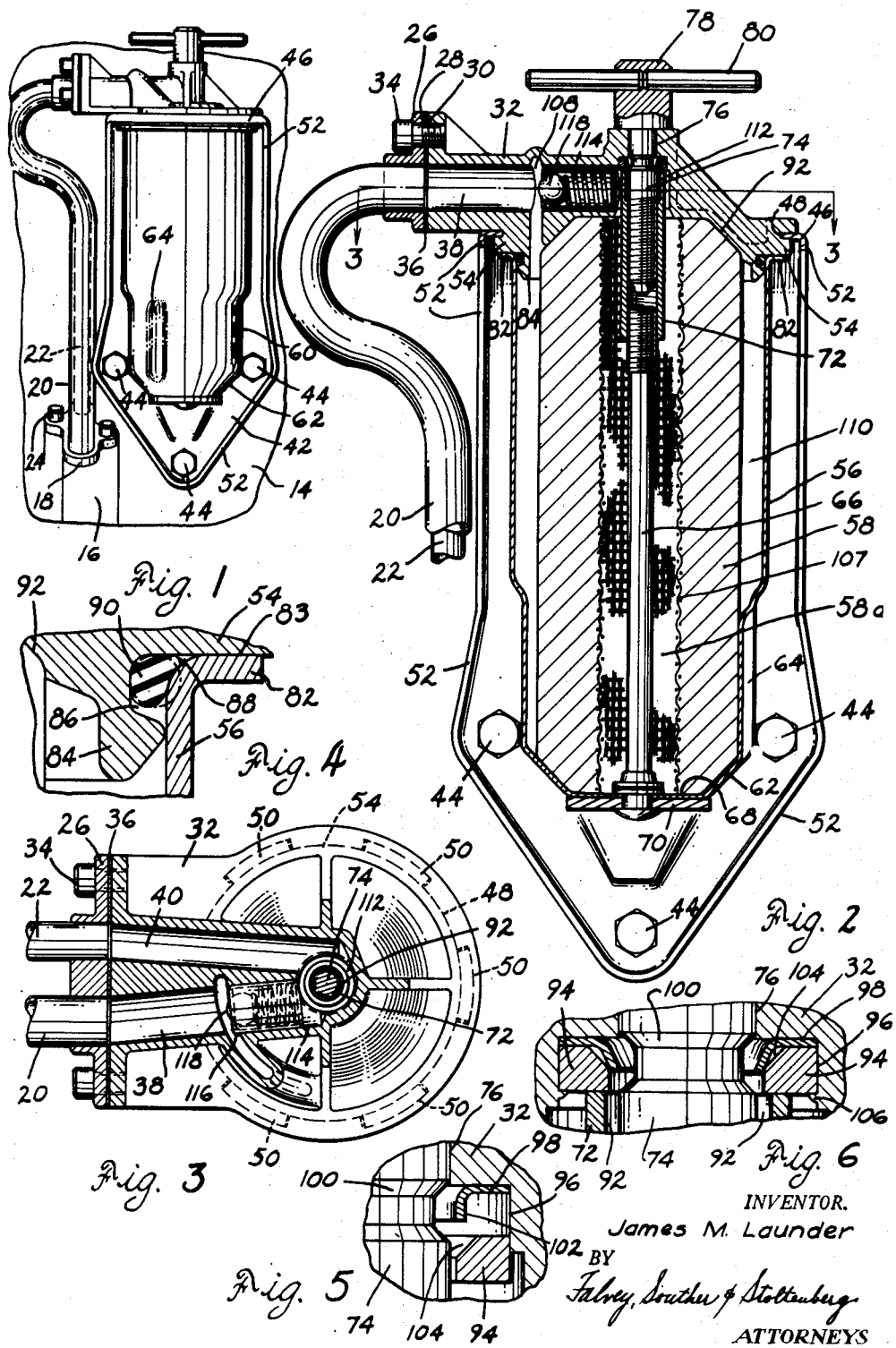
INVENTOR.
James M. Launder

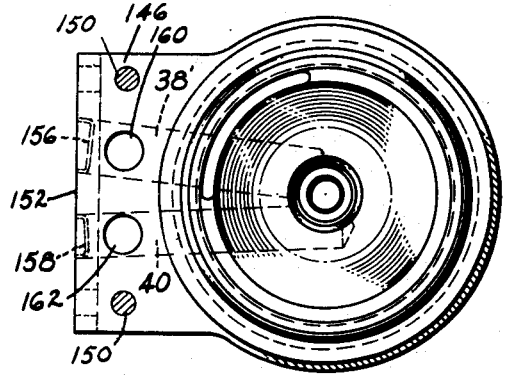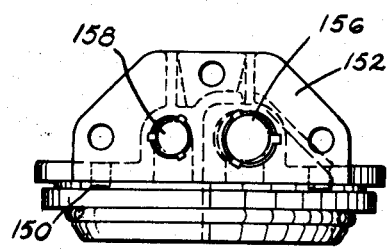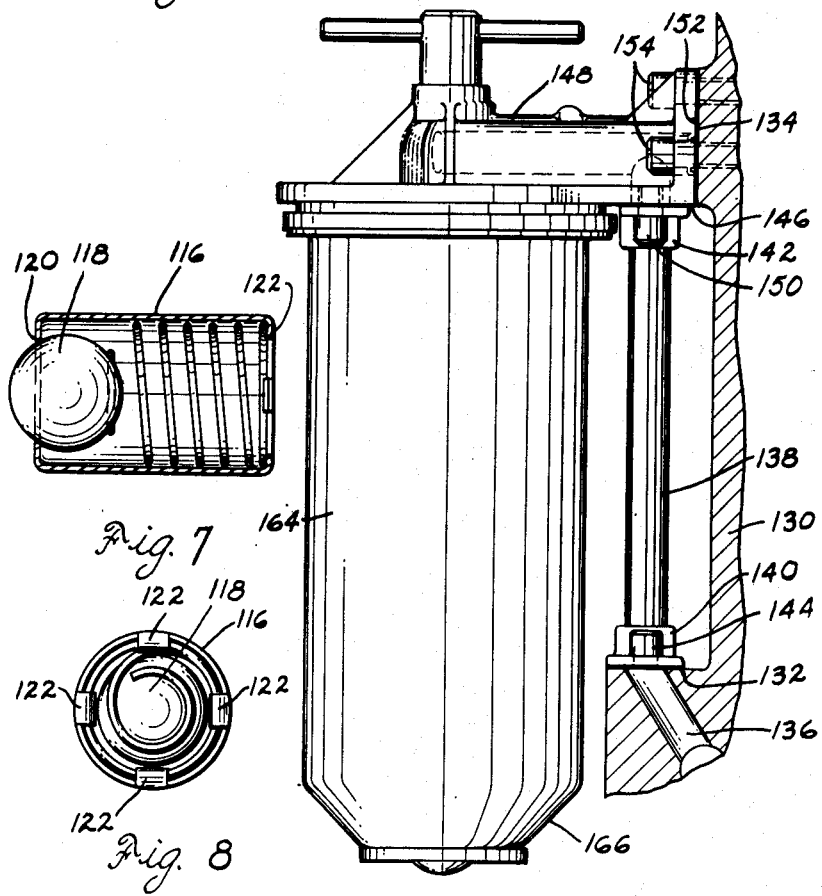

Patented Nov. 3, 1953

2,657,806

UNITED STATES PATENT OFFICE 2,657,806

FILTER

James Mark Launder, Toledo, Ohio, assignor to The Electric Auto-Lite Company, Toledo, Ohio, a corporation of Ohio Application December 26, 1947, Serial No. 794,069

4 Claims. (Cl. 210—183)

This invention relates to filters for removing impurities from liquids and, in its more specific aspects, to a filter adapted to be connected into the lubricating systems of automotive engines.

The invention includes the provision of a filter assembly with a removable filter cartridge simple in construction, inexpensive to manufacture, easy to install, and very efficient in use, the filter assembly comprising effectively-joined, separable parts which will permit the removal of all contaminants and the ready replacement of the filter cartridge and in which the possibility of leakage is obviated.

The invention also includes the provision of novel means for securing the separable parts of a filter housing, the securing means being so arranged that only a predetermined force can be applied to the separable parts of the housing irrespective of the force exerted to urge them together.

The invention comprehends an oil filter construction for internal combustion engines in which the oil does not drain back but the filter remains full of oil when the engine is not in operation, thereby the usual delay, upon starting the engine, in building up pressure for producing an effective oil flow to the engine bearings caused by the presence of air within the filter is eliminated.

The invention embraces an engine oil filter assembly including a detachable sub-assembly adapted to carry, for effective disposal, the contaminated filter element and all foreign matter when changing elements, insuring thereby that the remaining parts of the filter are left essentially clean, whereby the possibility of foreign matter being left in the filter assembly to contaminate the new clean element or have access to the engine bearings is avoided.

The invention contemplates the provision of oil-leak-proof sealing means for a filter container formed by a cover and a detachable housing, the sealing being accomplished by providing a substantial interference between the detachable housing and a distortable ring associated with the cover whereby greater manufacturing tolerances of the parts are allowed and a comparatively low force is required to seal cover and housing because of the substantial radial contact between the detachable housing and distortable ring, thereby permitting the use of a wing nut run down finger-tight.

The invention comprises a filter construction wherein the filtering element is held in proper relation within a composite housing and concurrently an oil-leak-proof seal is obtained between the cover and detachable casing of said housing by the simple manual operation of turning a member carried by the cover to secure and seal the casing thereto.

The invention is inclusive of a very simple and effective pressure-responsive device used as a filter by-pass valve forming a unitary assembly calibrated outside and independently of the filter, and adapted for quick insertion into the filter assembly.

The invention is concerned with filter connecting conduits which perform the function of fluid passages as well as a structural support, thus eliminating line breakage and simplifying the installation of a filter to automotive engines.

The invention encompasses the provision of a very effective arrangement for retaining a member to a support particularly adaptable for an oil filter, the arrangement permitting the rotary movement of the member with respect to a support while restraining relative longitudinal movement therebetween as well as the removal therefrom.

The invention is inclusive of a housing of sheet metal formed of separable sections, one of said housing sections having a member fixed thereto for clamping in closed position said sections. The clamping member is provided adjacent to its free end with abutment means adapted to be engaged by the other housing section when a predetermined force has been applied whereby an effective indication of the sufficient tightening of the sections is obtained, eliminating thereby the possibility of damaging the housing when undue force is exerted to clamp the sections.

An object of the invention is to provide an economical and compact oil filtering device for internal combustion engines that can be easily and quickly disassembled and assembled for service or for the replacement of the filtering cartridge by any person without tools and without disturbing the fluid connections of the filtering device with the engine lubricating system.

Another object of the invention is the improvement in the effectiveness of a deformable element for sealing separable sections of a container for fluids such as a removable casing and cover. The effectiveness of the sealing element is materially improved by the arrangement of the invention by causing the deformation of its normal cross-section into a wedge-shaped configuration and the employment of the fluid pressure within the container to urge the edge of the wedge-shaped configuration into a tapered annular perimeter formed between the separable sections when in closed position, so that a maximum area of surface of contact of the sealing element with both separable sections is accomplished.

Another object of the invention resides in providing a filtering device wherein the filtering cartridge is properly secured in place and concurrently an oil-leak-proof seal is produced between a separable casing and cover by the simple operation of clamping them together through the threaded connection of members carried by the cover and casing respectively.

Another object of the invention resides in the production of a filtering device which is assembled by simply inserting the filter cartridge in a detachable casing and clamping the casing to the cover by the simple operation of turning a member carried thereby. The casing is formed with sections whereby the filter cartridge is properly spaced with respect thereto and positively held in position when the casing is clamped to the cover.

Another object of the invention is the provision of a simple method for retaining in an aperture of a housing section or cover a threaded member for rotary movement relative thereto but against longitudinal movement. The method comprising the distortion of the flange of a collar from a vertical to angular position whereby the margin of the flange projects into a depression formed on the threaded member and of holding said collar in position adjacent said housing section, the distortion and holding secured by the action of a ring like member.

Another object of the invention resides in an engine oil filter of very simplified construction which automatically by-passes oil in case the filter element becomes clogged by diverting the oil flow from the filter inlet directly into the outlet passage with the minimum of tortuosity or resistance, so that effective lubrication of the engine bearings is secured even though changing the filter element is neglected.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is an elevational view of a filter incorporating the invention as attached to the block of an automotive engine;

Fig. 2 is an elevational view in section of the filter;

Fig. 3 is a plan view, partly in section, taken along line 3—3 of Fig. 2;

Fig. 4 is an enlarged sectional elevation taken at the joint between the elements of the filter container;

Fig. 5 is an elevational view, partly in section, of a detail of the cover of the container showing an original condition;

Fig. 6 is a view similar to Fig. 5, showing the same structure in final position;

Fig. 7 is a sectional elevation of a valve assembly inserted in the cover of the container;

Fig. 8 is an elevation taken from the right end of Fig. 7;

Fig. 9 is an elevational view, partly in section, of a modification of the invention;

Fig. 10 is a plan view of the bottom of the cover of the container shown in Fig. 9, and Fig. 11 is an elevational view of the cover flange as taken from the right in Fig. 9.

Referring to the drawings, particularly to Fig. 1, an engine block 14 is shown in part, having a pad 16 for attaching a flange 18 of a pair of fluid conduits or pipes 20 and 22 by means of screws 24, threaded into the upper surface of the pad 16, a gasket sealing means being provided as is well known in the art. The conduit 20 is by this construction placed in communication with an aperture (not shown) in the pad which, in turn, is in communication with the oil circulating pump (not shown) of the engine. In a similar manner conduit 22 is placed in communication with a second aperture (also not shown) in the pad 16 which, in turn, is placed in communication with the oil lubricating system of the engine leading to the bearings and the like. If it is desired to use the filter in the lubricating system for the purpose of filtering or cleansing all of the oil flowing to the bearings and the like, all of the oil issuing from the circulating pump of the lubricating system will flow through the pipe 20 and after traversing the filter will enter the pipe 22 to proceed to its lubricating function in the system. However, by-pass means may be provided in the block 14 to allow only a portion of the oil flowing in the system to flow through the filter if such a system is desirable.

The conduits 20 and 22 extend upwardly from the pad 16 and are given, adjacent their upper ends, a goose-neck conformation for the purpose of turning through a 90° angle which terminates in a second flange member 26 having a vertical face 28 to cooperate with a flanged face 30 positioned on a cover or relatively stationary element 32 of the composite filter container. Screws 34 are provided to hold the faces 28 and 30 together of flange 26 and cover 32, the seal being provided by the use of a pierced gasket member 36 positioned therebetween. By this means pipe 20 is placed in communication with passageway 38 in the stationary section 32 of the filter container and pipe 22 is placed in communication with passageway 40 (Fig. 3). Oil or other fluid from the circulating pump flows into the filter container via passageway 38, and filtered oil flows out of the container via passageway 40, as will be described in further detail hereinafter.

The cover 32 of the filter container is held in fixed relation on the engine block 14 by means of a bracket 42 which is affixed to the block 14 by means of screws 44 threaded therein. At the upper end of the bracket 42, an integral horizontal extension 46 is provided which is pierced forming an aperture 48 having bayonet slots 50 equally spaced along its inner perimeter. For the purpose of stiffening the bracket 42 and its horizontal extension 46, a terminal flange 52 is provided. The cooperative relation between the cover 32 and the horizontal extension 46 of the bracket 42 is provided by a downwardly-extending boss 54 which is also provided with bayonet slots 46 to cooperate with the bayonet slots 50 on the edge of the aperture 48 of the horizontal extension 46. The boss 54 is fitted into the aperture 48 with the bayonet slots 50 and 54 on the separate members in staggered relation to allow interfitting of the parts. Rotation of the cover 32 will then place the slots in aligned relation so as securely lock the cover to the bracket. The slots are arranged so that when the cover 32 is in locked position on the bracket, the face 30 thereof will be in normal relation to the block 14 and in parallel relation with the face 28 on the flange member 26, which must necessarily be in disengaged relation during the locking operation.

This construction allows the filter assembly, inclusive of the cover 32 and its cooperating detachable housing section 56 enclosing the filter element, as will be described hereinafter, to be removed as a unit from the engine block by merely removing the screws 34 and turning the cover 32 to break the locking relation at the bayonet slots with the bracket extension 46, and lifting the filter container upwardly through the aperture 48. A new filter assembly can be replaced if desired, including a new cover 32 and a new housing section 56 containing a new filtering element.

The housing section 56, having a cooperative detachable relation with the cover 32, extends downwardly and depends therefrom to substantially the bottom of the bracket 42 as is best seen in Fig. 1. The dimensions of the detachable section 56 are controlled by the size of the filtering element 58 positioned within the housing. The lowermost section of the housing 56 is preferably reduced to provide a smaller portion 60 and is formed to terminate in a truncated cone section 62. A portion of the walls of the housing 56 are provided with vertical flutings 64 in spaced relation about its periphery for the purpose of aiding in centering the filter element in the housing. This centering action is aided by the cone section 62, which compresses the tubular filter element 58 from a normal cylindrical section to a cone section as shown. In addition, section 62 also forms a seal between the filter element and the housing 56. The compressive force on the tubular filter element 58 is created by a threaded stem 66 located centrally of the housing 54 and fixedly attached to the base 68 thereof by riveting. The base 68 is provided with a reinforcing plate 70 located on the outside surface of the base 68. The stem 66 cooperates with a threaded sleeve 72 which, in turn, cooperates by a threaded relation with a headed bolt 74 projecting through a central aperture 76 of the cover member 32. The head 78 of the bolt 74 is provided with hand-holds 80 and, when turned manually, pulls the threaded sleeve 72 and the central stem 66 toward the cover 32 to compress the filtering element 58 and to create a cooperative relation between the housing 56 and the cover 32 to provide a seal as will now be described.

The upper end of the housing section 56 is provided with an outwardly-extending flange 82 which abuts against the lower face 83 of the boss 54 formed on the cover 32. The boss 54 is provided with a downwardly-extending heated flange 84 adapted to fit into the upper end of the housing 56. The head of the flange 84 provides an annular groove 86 whose one side is coincident with the lower face 83 of the boss 54, against which the flange 82 abuts, so that the cooperative relation therebetween forms a converging annular space or tapered annular perimeter, as is best seen in section in Fig. 4. An annular gasket member 90 is provided to fit into the groove 86 under slight tensile stress, being normally of cylindrical sections and made of relatively soft resilient material capable of withstanding contact with the fluids being filtered. The O-ring, as these gasket members 90 are generally called, is of such dimension as to be under slight compression when the housing 56 is placed in operative position about the headed flange 84, as best seen in Fig. 2, and when subjected to fluid pressure inside the housing 56 and the annular groove 86 will be distorted by its action and thrust thereby into the converging sides of the annular space 88 to form a seal between the cover 32 and the housing 56. As the pressure in the housing 56 and the groove 86 communicating therewith becomes greater, so also will the force acting upon the O-ring 90 become greater to increase the force thrusting the ring into the converging space or tapered annular perimeter 88 to improve the seal.

The stem 66, the threaded sleeve 72 and the headed bolt 74 cooperate together to compress the hollow filtering element through whose central aperture 58a they extend, so that the ends of the filtering element are distorted into a conical formation, by the cone section 62 on the closed end of the housing section 56 and by another cone section 92 formed on the lower side of the cover 32 above the headed flange 84. Both cone sections are in concentric relation. The distortion of the ends of the filtering element from a cylinder to a cone section creates the necessary seals at the ends to prevent flow of fluids around the filtering element rather than through the filtering element as will be described further hereinafter. When the distortion reaches the desired point, the flange 82 of the housing 56 abuts against the lower face 83 of the boss 54 to create the converging annular space 88 to allow the seal to be formed therebetween by the O-ring 90 as already described. Close uniform physical contact is required between the flange 82 and the face 83, but not one requiring high compressive forces which tend to deform or bulge the sheet metal housing section 56. A force-limiting structure to prevent this overloading of the filter container sections and particularly the deformation of the sheet-metal housing section 56 is provided and will now be described.

The sleeve 72 is in threaded relation with the stem 66 at its lower end and with the bolt 74 at its upper end. The upper end of the sleeve 72 may be undercut to give a clearance for the threads on the bolt 74 and is adapted to abut against a ring member 94 which is press-fitted into a chamber 96 in the cover 32 with a flanged torus 98 interposed as shown in Fig. 6 (to be described further hereinafter) and their cooperation form a stop to prevent further drawing up on the stem 66 by the bolt 74 when the flange 82 of the housing 56 is in contact with the face 83 of the cover 32. The sleeve 72 is adjusted to give the proper relation between the parts with reference to the stem 66 and thereafter the sleeve 72 and the stem 66 are frozen by upsetting or welding their threaded relation.

In order to prevent the bolt 74 from becoming disengaged with the aperture 76 of the cover 32, it is provided with suitable depressions such as an annular groove 100 adjacent to the chamber 96, into which is press-fitted the ring 94. The torus 98, having a depending normal or vertically-extending flange 102, is first fitted into the chamber as shown in Fig. 5, where the flange will allow the introduction of the bolt 74. With the bolt 74 in position, the ring is placed about the bolt and pressed upwardly until its beveled edge 104 contacts the lower end of the flange 102 and displaces it inwardly from a vertical to an angular direction by distortion and thereby reduces the diameter of the aperture so as to create an overhang extending into the annular groove 100 which will prevent retraction of the bolt 74 by interference with the walls of the groove. The ring 94 is then pressed home into the chamber 96 in the cover 32 and a portion 106 is upset to hold it permanently in position.

The filtering element 58 is preferably one formed of fuzzy yarn wound in crisscross to form openings between the turns which are laced with the fuzz to give a filtering action. It is wound in the form of a hollow cylinder on a tube 107 of a heavy screen or foraminous material with squared ends which are subsequently deformed by the cone or angular portions of the cover and the housing to form seals at each end thereof to prevent flow of fluids around the filtering element. The fluids are led from the passageway 38 through a transverse passageway 108 downwardly into a chamber 110 formed between the inside of the housing 56 and the outside of the filtering element 58.

The fluid then flows through the filtering element to remove its impurities and passes through the screen tube 107 into a tubular chamber 58a around the stem 66, whence it flows upwardly into an annular passageway 112 formed between the sleeve 72 and the cover 32 which is in communication with the passageway 40, already described, and thence into pipe 22 back into the engine block to lubricate the moving parts thereof.

A by-pass passageway 114 is provided between passageway 38 and the annular passageway 112 which communicate with the chamber 110 outside of the filter element 58 and the tubular chamber 58a on the inside of the filter element respectively, whereby the passageway 114 is placed in parallel with the filter element and allows by-passing of the fluid, should the filter element become clogged. Press-fitted in the passageway 114 is a tubular member 116 housing a spring-pressed ball valve 118 urged against valve seat 120 formed at one end of the tube member 116 by an inturned flange. The opposite end of the tube is provided with tabs 122 to seat the spring for the ball 118. This construction forms a unitary assembly and allows calibration of the ball valve before the assembly is mounted in the passageway 114. The valve assembly is adapted to be readily mounted in the passageway 114, which is accomplished by introducing the assembly through passageway 38. The assembly is mounted in a manner, so that the ball 118 is acted upon by fluid pressure in the inlet or in chamber 110 on the outside of the filter element 58. When the pressure is sufficiently high, the ball 118 will be urged to move against its spring bias to allow fluid to by-pass through the passageway 114 to passageway 112 and out of the housing and cover by passageway 40, thereby allowing the fluid to flow in parallel with the filter element 58, should the pressure at the inlet exceed a predetermined value.

Referring now to Figs. 9, 10 and 11, a modification of the invention is shown. Here the engine block 130 is provided with two faces or pads 132 and 134, normal to each other and provided with tapped holes for the attachment of flanges of the connecting members. The lower face 132 is pierced by a pair of passageways 136 (only one shown) forming the inlet and outlet for the filter similar to that of the modification, already described, and has attached thereto a supporting member 138 provided with separable or independent passageways having flanged end sections 140 and 142, the lower of which is bolted to face 132 by bolts 144, and the upper to the lower face 146 of a cover member 148 by bolts 150. The cover 148 is similar to the cover member 32 of the embodiment of the invention, already described. The cover member 148 is provided with a lateral extension terminating in face 152 which is fitted against face 134 of the motor block 130 and bolted thereto by bolts 154, to securely hold the whole filter assembly in position on the engine. The cover member 148, being similar to the one already described, has corresponding passageways 38' and 40' which, in this modification, are plugged at the face 152 by press-fitted cups 156 and 158 and communication is established with passageways of member 138 by transverse bores 160 and 162 drilled from lower face 146 of the cover 148 into the respective passageways as is best seen in Fig. 10.

Communication from the inlet (passageway 136) is obtained via one of the passageways of member 138 to passageway 38' through bore 160, thence through the filter as has already been described in the earlier modification to passageway 40', thence through aperture 162 to the second of pipes 138 and finally through the outlet passageway in face 132. The supporting member 138 may be forged from a solid piece and bored longitudinally if desired to provide integrally-formed passageways. In the modification, the housing 164 is of uniform dimension except for the cone section 166 at its lower end. The bayonet slots described in the earlier modification are omitted. In other respects the filtering device is substantially the same.

In the embodiments of the invention hereinbefore described it is to be noted that the inlet and outlet of the filter are positioned at its upper end, in order to assure that the filter unit will always be full of fluid, inasmuch as in such arrangement there is no drain-back to the engine by the action of gravity.

It should be noted that by the force-limiting structure provided to prevent overloading or deformation of the filter container, this structure will give a solid feel producing a very effective indication of the proper tightening of the filter sections. This condition is manifested on the hand-holds 80 of the threaded member 74 when the cooperating threaded sleeve 72 is in engagement with the stop member or ring 94 of the stationary filter section 32.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation.

What is claimed:

1. In a liquid filter, a closed casing formed of separable sections, a filtering medium confined within said casing, clamping means associated with said sections for holding the same in closed position by the direct abuting engagement of their marginal mating end surfaces, said means including a winged bolt mounted for rotary movement with respect to one section and held against longitudinal movement with respect thereto, a channel positioned within the casing to bridge the juncture of the abutting mating end surface a member of ring-like configuration carried by said channel to be positioned adjacent to the juncture of the abutting end surfaces, and the ring-like member loosely fitting said channel but projecting therefrom for being distorted by engaging the inner face of one of the end surfaces of said separable sections and by the fluid pressure in said casing to form a leak-proof seal for the directly abutting engaging surfaces of said separable sections for mutual contact therewith, the effectiveness of said contact increasing as the fluid pressure in the casing increases.

2. In a filter, a container part, a closure part, said parts joined together to form a leak-proof casing enclosing a removable element for filtering a liquid under pressure, an outwardly turned terminal rim formed at the open end of the container part, an annular seat provided on the under side of the closure part for direct abutting engagement with said terminal rim forming the main juncture of said parts, means carried by the closure part having a depending portion projecting within the open end of the container part, said depending portion formed to provide an annular groove positioned to bridge the juncture of said annular seat with said terminal rim when said parts are joined together, a ring-like sealing member of resilient material positioned in said groove, said sealing member being dimensioned to provide slight clearance with the side walls of said groove and project therefrom to be placed into simultaneous sealing engagement with the interior surfaces of the container and closure parts adjacent to the juncture of said annular seat and terminal rim providing a leak-proof seal for the directly abutting seat and rim of the closure and container parts, and the said ring-like sealing member adapted to be distorted by the pressure of the liquid in the casing and thereby be thrust into tighter sealing engagement with the said interior surfaces of both parts adjacent the juncture of said seat and rim so that the effectiveness of the simultaneous sealing engagement of the sealing member therewith increases as the pressure of the liquid in the casing increases.

3. In combination a container part and a closure part joined together to form a liquid-tight casing having ports for the ingress and discharge of a liquid under pressure, an outwardly turned rim forming a curved section located at the open end of the container part, a planar surface provided on the under side of said closure part for direct abutting engagement with said rim, the internal surface of one of said parts having means providing an annular groove whose one side is substantially coincident with said planar surface so as to form with said curved section of the container part a converging annular space adjacent said groove when said container and closure parts are joined together, a ring-like sealing member of resilient material having a cylindrical section positioned in said groove, said ring-like sealing member being dimensioned to provide slight clearance with the side walls of the groove and project therefrom to be placed in simultaneous contact with the inner surface of the wall of the container part and the under side of the closure part adjacent their juncture and to be exposed to the pressure of the liquid in the casing forming a leak-proof seal for the directly abutting planar surface and rim of said parts, and said ring-like sealing member being deformed when said rim is in direct engagement with said planar surface and subjected to the liquid pressure within the casing so that as the pressure increases said ring-like sealing member is thrusted in the converging annular space adjacent said groove providing a seal whose effectiveness increases as the liquid pressure in the casing increases.

4. In a liquid filter, a closed casing formed of separable sections to permit access to the interior of the casing, clamping means associated with said sections for causing direct abutting engagement of their cooperative mating marginal surfaces for clamping said sections in position to form the closed casing, a filtering element clamped at its ends by the end portions of the joined casing sections, supplementary abutment means forming a part of said clamping means carried by one of said sections for engagement with the central portion of the inner surface of the other section when a predetermined force has been applied as the separable sections are drawn in position to form the closed casing, an annular channel carried by one of said sections for alignment with the plane of juncture of the cooperating mating marginal surfaces and being spaced from their inner faces, a ring-like sealing member positioned in said channel and being dimensioned to provide slight clearance with the side walls of said channel and project therefrom into engagement with the inner faces of said mating surfaces forming a leak-proof seal for the said directly abutting mating marginal surfaces, said sealing member being distorted and under slight compression by engaging the inner faces of the said mating surfaces and by the fluid pressure in said casing to form a liquid-proof seal between the separable sections, and the said ring-like member being subjected to the pressure of the liquid in the casing and thrusted thereby for tighter sealing engagement with the inner faces of the said mating surfaces so that the effectiveness of the sealing engagement of the ring-like member therewith increases as the pressure of the liquid in the casing increases.

JAMES MARK LAUNDER.

References Cited in the file of this patent

UNITED STATES PATENTS

| Number | Name | Date |
|---|---|---|
| 588,800 | Livingston | Aug. 24, 1897 |
| 1,148,237 | Kneuper | July 27, 1915 |
| 1,166,000 | Pelton | Dec. 28, 1915 |
| 1,651,797 | Astrom | Dec. 6, 1927 |
| 1,788,510 | Everson | Jan. 13, 1931 |
| 1,822,006 | Bull | Sept. 8, 1931 |
| 2,056,756 | Wiedhofft | Oct. 6, 1936 |
| 2,088,243 | Koinzan | July 27, 1937 |
| 2,108,798 | Dalrymple | Feb. 22, 1938 |
| 2,177,191 | Sandberg | Oct. 24, 1939 |
| 2,196,821 | Arnold | Apr. 9, 1940 |
| 2,247,445 | Long | July 1, 1941 |
| 2,279,699 | White | Apr. 14, 1942 |
| 2,325,399 | Houston | July 27, 1943 |
| 2,342,699 | Hoffman | Feb. 29, 1944 |
| 2,247,445 | Long | July 1, 1941 |
| 2,389,814 | Pond et al. | Nov. 27, 1945 |
| 2,390,539 | Katcher | Dec. 11, 1945 |
| 2,439,936 | Kasten | Apr. 20, 1948 |

FOREIGN PATENTS

| Number | Country | Date |
|---|---|---|
| 574,540 | France | of 1924 |